United States Patent
Lin et al.

(10) Patent No.: US 9,183,115 B2
(45) Date of Patent: Nov. 10, 2015

(54) TESTING METHOD AND TESTING APPARATUS FOR TESTING FUNCTION OF ELECTRONIC APPARATUS

(71) Applicant: MStar Semiconductor, Inc., Hsinchu County (TW)

(72) Inventors: Yi-Cheng Lin, Hsinchu County (TW); Shen-Pin Lin, Hsinchu County (TW); Chi-Chang Hsieh, Hsinchu County (TW); Wei-Chun Kao, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 278 days.

(21) Appl. No.: 13/689,900

(22) Filed: Nov. 30, 2012

(65) Prior Publication Data

US 2013/0145217 A1 Jun. 6, 2013

(30) Foreign Application Priority Data

Dec. 1, 2011 (TW) .............................. 100144199 A (51) Int. Cl.
*G06F 11/36* (2006.01)

(52) U.S. Cl.
CPC ........ *G06F 11/3636* (2013.01); *G06F 11/3688* (2013.01)

(58) Field of Classification Search
CPC ... G06F 11/106; G06F 11/27; G06F 11/3684; G06F 11/2215
USPC ........................................................ 714/38.1
See application file for complete search history.

(56) References Cited

U.S. PATENT DOCUMENTS

| | | | |
|---|---|---|---|
| 2004/0044992 A1* | 3/2004 | Muller et al. | 717/124 |
| 2008/0046784 A1* | 2/2008 | Gygi et al. | 714/46 |
| 2009/0254547 A1* | 10/2009 | Hirota | 707/5 |
| 2011/0200980 A1* | 8/2011 | Takahashi et al. | 434/365 |
| 2012/0191803 A1* | 7/2012 | Ray et al. | 709/217 |
| 2013/0007666 A1* | 1/2013 | Song et al. | 715/835 |

* cited by examiner

*Primary Examiner* — Jigar Patel
(74) *Attorney, Agent, or Firm* — WPAT, PC; Justin King (57) ABSTRACT

A method for testing a function of an electronic apparatus is provided. The method includes steps of: searching for a location corresponding to the function to be tested, sending a command according to the location to perform the function to be tested, and determining whether an error occurs in the function according to a response from the function in response to the command.

12 Claims, 9 Drawing Sheets

IMENUMODEL_GetTotalSize(pDataInf->
sCommonInf.pIMenuModel,&_menuSize)

do if( pDataInf->pFp && g_bShowMenu && _menuSize )
{

⋮ itemNameAscii = MsAllocateMem(MAX_TEST_LEN + 1);
if (NULL == itemNameAscii)
{
break;
}
itemNameAscii[MAX_TEST_LEN] = 0;

⋮ if(pDataInf->pFreeFp)
    pDataInf->sCommonInf.pOwner, eItemType);

LOG_TEST(MAE_LEVEL_GRAPHIC,)
"ITEM_INDEX__%d__ITEM_NAME__%s__ITEM_END",_i,itemNameAscii);
}

TESTING METHOD AND TESTING APPARATUS FOR TESTING FUNCTION OF ELECTRONIC APPARATUS

This application claims the benefit of Taiwan application Serial No. 100144199, filed Dec. 1, 2011, the subject matter of which is incorporated herein by reference.

BACKGROUND OF THE INVENTION

1. Field of the Invention

The invention relates in general to a testing method and testing apparatus, and more particularly, to a testing method and testing apparatus suitable for different user interfaces and different hardware statuses.

2. Description of the Related Art

An electronic apparatus tends to offer versatile functions with modern technology development. It is therefore a critical task for manufacturers to test the various functions to ensure that the electronic apparatus achieve the precise functions. Tests are usually performed with a test program, commonly referred to as a test script. For example, to test an outgoing call dialing function of a telephone, a command is sent (from a testing apparatus) to an electronic apparatus to be tested to command the electronic apparatus to make a phone call (or to simulate a dialing operation instead of making a real phone call). The electronic apparatus sends a response according to an execution condition of the function to be tested, and the testing apparatus then determines whether the function is functional according to the response.

Figure 1:
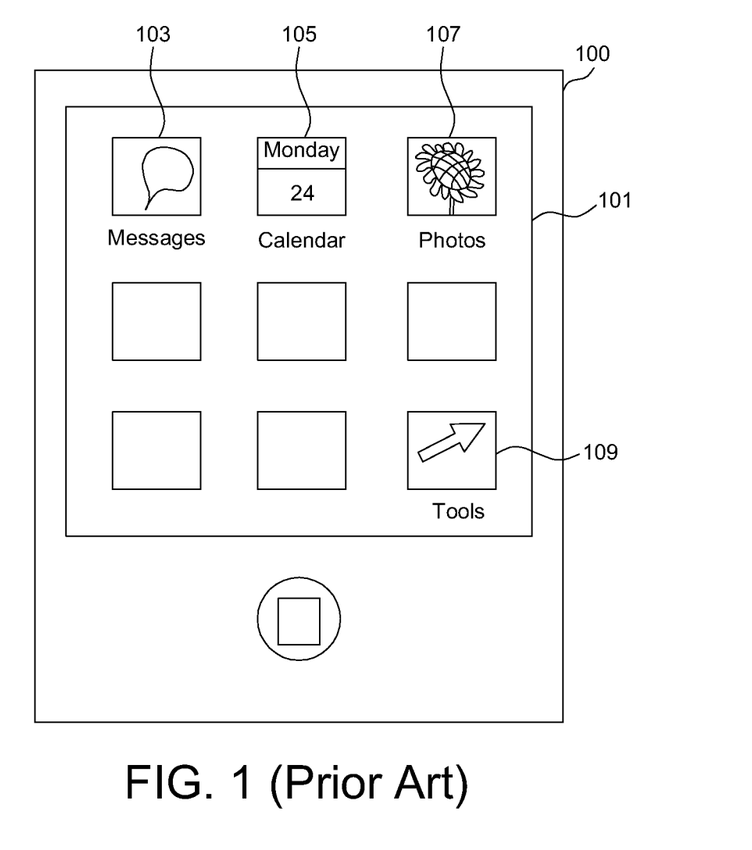
FIG. 1 is a schematic diagram of a user interface on a cell phone.

Current testing methods are usually implemented to only user interfaces with static icons. FIG. 1 shows a schematic diagram of a user interface on a cell phone. As shown in FIG. 1, a screen 101 of a cell phone 100 displays a user interface, which includes icons 103, 105, 107 and 109, respectively representing functions of messages, a calendar, photos and tools.

Figure 2:
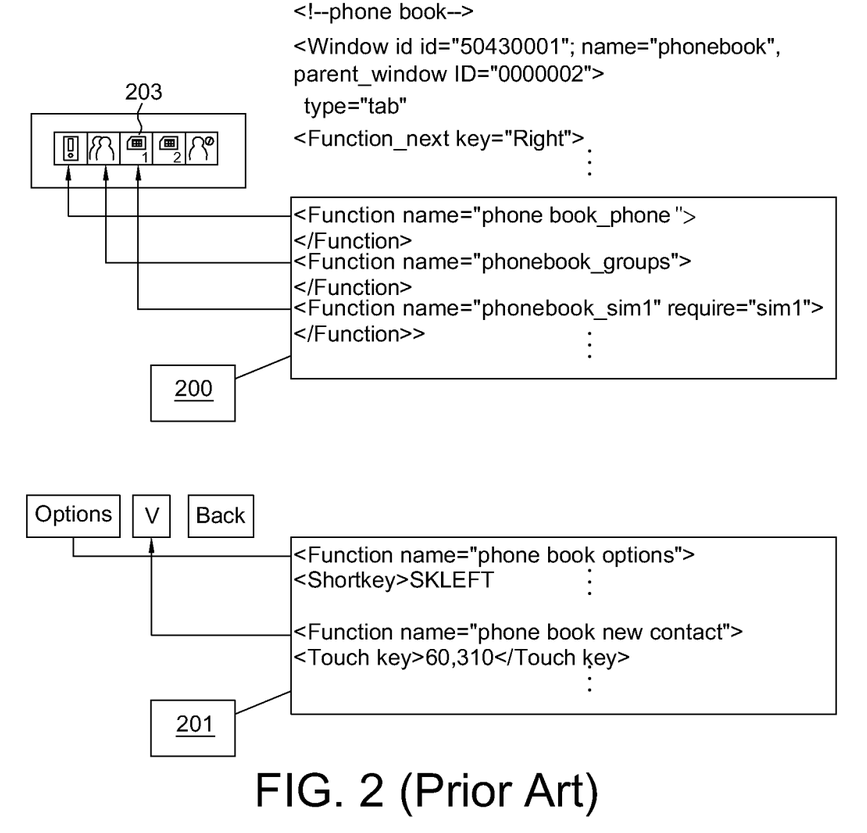
FIG. 2 is a schematic diagram of a program to be tested describing a user interface and functions of the user interface using an extensible markup language (XML) in a conventional solution.

The user interface shown in FIG. 1 and the associated functions may be described by an extensible markup language (XML) or other similar markup languages. FIG. 2 shows details of a function to be tested describing a user interface and functions of the user interface by XML. Each window has a dedicated window ID for determining functions defined in the window and for describing a type of a current window. For example, a contact list window may include functions such as "categorize by group" and "categorize by phone book". The program language in a program block 200 describes a function list of the window, i.e., the functions supported by the window, and the program language in a program block 201 describes operations of the functions in the window. Other details in FIG. 2 are known for those skilled in the art, and shall be omitted herein.

In a test process, each function has a corresponding test program. However, in the prior art, a test program written for the interface in FIG. 1, due to the deficiency of learning dynamic locations of the icons corresponding to the functions, can only be applied to the interface having static icons shown in FIG. 1. For example, the icon 103 represents the function of messages and the icon 109 represents the function of tools. In the event that the locations of the icons 103 and 109 are exchanged, corresponding changes should be first made to the test messages and the test programs of the test tool before testing or else an error will be incurred during the test process.

Figure 3:
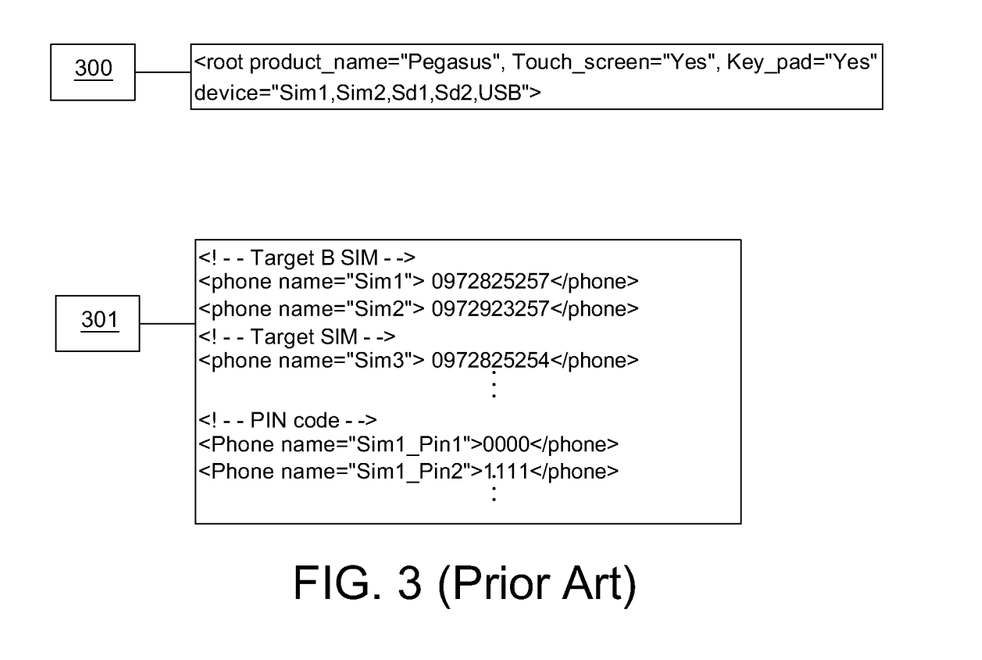
FIG. 3 is a schematic diagram of a program to be tested describing a hardware status of an electronic apparatus to be tested using XML in a conventional solution.

Moreover, a conventional testing method does not usually take dynamic hardware statuses into consideration. FIG. 3 shows a schematic diagram of a program to be tested describing a hardware status of an electronic apparatus to be tested using the XML. A program block 300 represents a hardware status of the electronic apparatus to be tested, and can be dynamically updated during the test process. For example, it means the electronic apparatus to be tested supports a touch function when "Touch_screen" equals "Yes", and the electronic apparatus to be tested supports a keyboard function when "Key_Pad" equals "Yes". Further, statuses of accessories or peripheral devices connected to the cell phone, such as a subscriber identity module (SIM) card, a memory card and earphones, can also be defined by the program block 300.

However, as previously stated, conventional testing methods usually do not take hardware statuses into consideration, and so unnecessary errors are often incurred. Taking the cell phone in FIG. 1 as an example, the cell phone can be inserted with an additional hardware device such as a SIM card or a memory card, and a testing staff may then need to perform certain tests on hardware access or other functions. In a situation that the hardware device is not inserted into the cell phone, a test command may still be sent such that an error message is generated due to continual lack of response to even lead to a stall or crash of the testing apparatus. In addition, a storage device such as a memory card may have drastically different file distributions or folder distributions, and so the conventional testing methods may need to sequentially change the test programs in response to the different file or folder distributions.

Therefore, it is obvious from the above discussions that, since test programs of conventional testing methods and testing apparatuses need to be constantly changed in situations where a user interface or hardware statuses are frequently varied, extra time and costs are required.

SUMMARY OF THE INVENTION

The invention is directed to a testing method and testing apparatus for tests of different user interfaces and different hardware statuses.

According to an embodiment of the present invention, a testing method for testing a function of a program in an electronic apparatus is provided. The program associates the function to an icon on a user interface. The method includes steps of: searching for a location of the program corresponding to the function, sending a command according to the location to perform the function, and determining whether an error occurs in the function according to a response of the function in response to the command. The command includes a sub-command representing a user behavior of moving to the icon on the user interface.

According to another embodiment of the present invention, a testing method for testing a function of a program of an electronic apparatus is provided. The method includes steps of: obtaining index information of all functions in a user interface from the electronic apparatus, obtaining a location of the function according to the index information and sending a command to perform the function, and determining whether an error occurs in the function according to a response of the function in response to the command.

According to another embodiment of the present invention, a testing apparatus for testing a function of a program in an electronic apparatus is provided. The function associates the function to an icon on a user interface. The testing apparatus includes: a storage device, storing a test program; and a control unit, for executing the test program to perform the above testing method.

Thus, according to the above embodiments, the issue of having to constantly changing the test program for cooperating with different user interfaces and hardware statuses is eliminated, and automated tests can be implemented without constant manual control.

The above and other aspects of the invention will become better understood with regard to the following detailed description of the preferred but non-limiting embodiments. The following description is made with reference to the accompanying drawings.

DETAILED DESCRIPTION OF THE INVENTION

Throughout the specification and the appended claims, certain terms are utilized for referring to specific elements. A person having ordinary skill in the art can easily appreciate that different terms may be used by hardware manufacturers for referring to a same element. Differences in terms in the specification and the appended claims are not to be construed for distinguishing the elements, and the elements are differentiated based on functional differences. Throughout specification and the appended claims, the term "comprise" is regarded as an open-end term to be explained as "include but not limited to". Further, the term "couple" includes any means of direct and indirect electrical connections. Therefore, if it is described that a first device is coupled to a second device, it means that the first device may be electrically connected to the second device in a direct manner, or in an indirectly manner through other devices and connection means.

Figure 4:
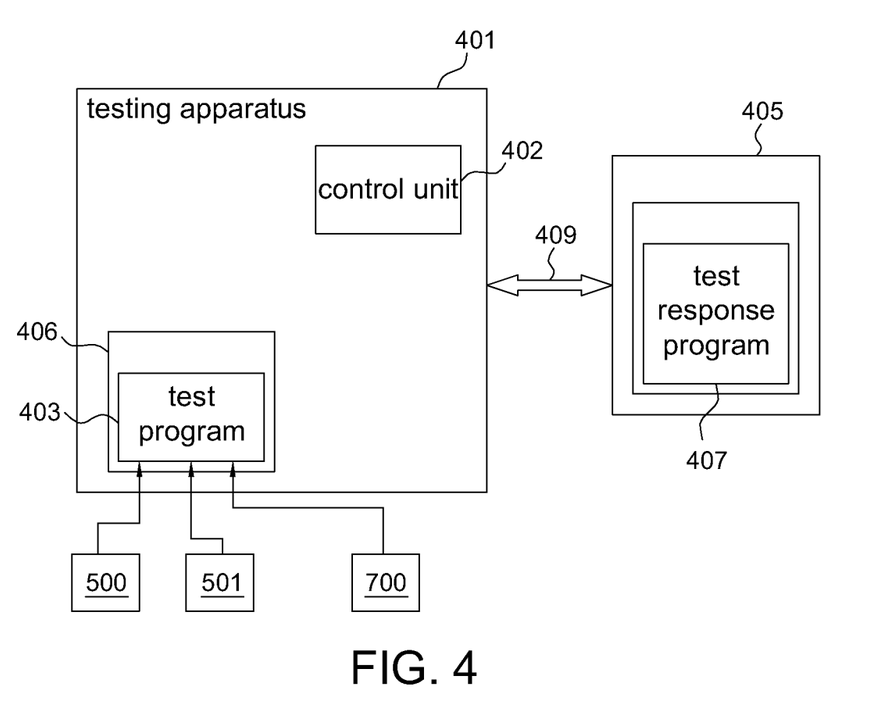
FIG. 4 is a block diagram of a testing apparatus according to an embodiment of the present invention.

FIG. 4 shows a block diagram of a testing apparatus according to an embodiment of the present invention. Referring to FIG. 4, a testing apparatus 401 includes a test program 403. The test program 403 sends a command to an electronic apparatus 405 for testing a function to be tested and may be stored in a storage device 406. The electronic apparatus 405 includes a test response program 407. The test response program 407 sends a response to the testing apparatus 401 according to a reaction of the function to be tested in response to the command, and the test program 403 then determines whether the function to be tested is functional according to the response. The test program 403 includes program blocks 500, 501 and 700, which shall be described shortly. It should be noted that, although an example of an XML file is utilized for illustrations below, other functional files may also be applied to the disclosure. The testing apparatus 401 includes a control unit 402 for executing the test program 403. For example, the control unit 402 is implemented by firmware cooperating with hardware such as a processor, or is implemented independently by hardware. The testing apparatus 401 and the electronic apparatus 405 communicate with each other via a transmission interface 409, e.g., a wireless or wired interface.

Figure 5:
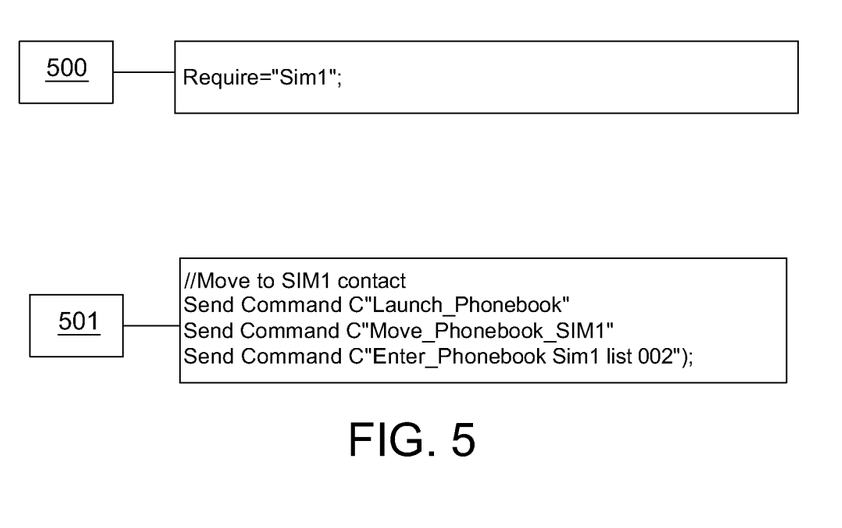
FIG. 5 shows operation details of a test program according to an embodiment of the present invention.
Figure 6:
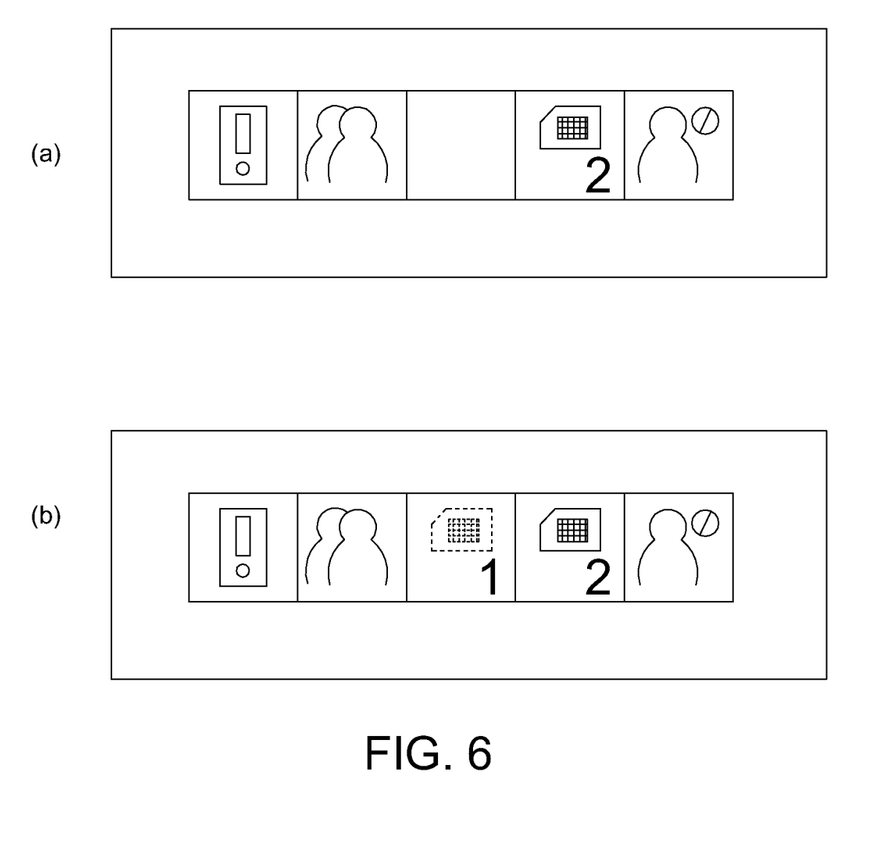
FIG. 6 is a schematic diagram of a non-display or a changed display when hardware is absent or unusable.

FIG. 5 depicts operation details of a testing program according to an embodiment of the present invention. The program block 500 in FIG. 5 defines required hardware. The function to be tested is terminated when the status of the hardware does not match the status defined by the program block 300. For example, a SIM1 card is required if a phone book function of the SIM1 card is to be tested. When the status of the SIM1 card in the program block 300 is not "Yes", i.e., no SIM1 card is in the electronic apparatus to be tested, the function of reading the phone book in the SIM1 card is terminated. In the presence of a condition possibly causing a test failure of the function to be tested, e.g., a contact surface of the SIM1 card in the electronic apparatus is damaged, functions associated with the SIM1 card are also terminated. That is to say, according to the hardware status of the electronic apparatus to be tested, the present invention dynamically determines whether to terminate function tests associated with the hardware during the test process. In an alternative embodiment, when it is detected that a hardware device corresponding to the function to be tested is not in the electronic apparatus, the icon corresponding to the hardware device is not displayed. For example, FIG. 6(a) does not include the icon 203 representing the SIM1 card compared to FIG. 2. Alternatively, when it is detected that a hardware device corresponding to the function to be tested is not in the electronic apparatus, the icon corresponding to the hardware device can be presented in a format different from that of other icons. Referring to FIG. 6(b) for example, the SIM1 card is depicted with dotted lines.

The program block 501 in FIG. 5 describes operation details of a test command in a test program according to an embodiment of the present invention. In principle, the program block 501 includes: searching for a location corresponding to the function to be tested in the program to be tested corresponding to the window, and sending a command according to the location to perform the function to be tested. For example, to test the phone book function of the SIM1 card in the program to be tested in FIG. 2, the test program searches for the location in the program to be tested corresponding to the phone book function, and sends a command according to the location: shifting twice to the right in the user interface defined in FIG. 2, and then reading the phone book of the SIM1 card. It should be noted that, being featured as capable of simultaneously describing the display of the user interface and the functions included in the user interface, the XML file associates certain functions with predetermined icons on the user interface. Thus, when the test program identifies the function to be tested in the program to be tested, the location of the icon corresponding to the function to be tested on the user interface can be obtained at the same time. As the test program obtains the location of the icon, a sub-command substantially same as a user operating the user interface to move from a current location to the location of the icon may be added to the test command. That is to say, apart from testing the function to be tested, the test command also includes a sub-command for simulating a user behavior of moving to the location of the icon and selecting the icon.

Figure 7:
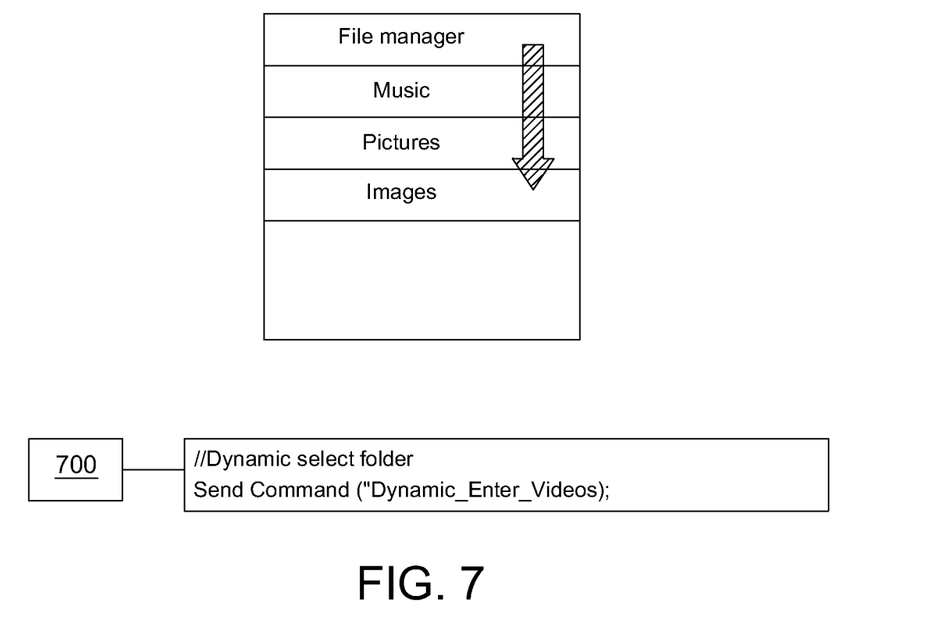
FIG. 7 is a schematic diagram of a dynamic command according to an embodiment of the present invention.

In addition to testing a common command of a user interface in a static description, the testing program disclosed by the present invention can also be utilized for testing a function of a dynamically changing user interface, e.g., a dynamic command for a function located in a storage device. As previously stated, arrangements of certain storage devices may change quite drastically. Hence, each time a level of a hierarchy and a window where a function to be tested is located may be different, and so the corresponding command is referred to a dynamic command. FIG. 7 shows a schematic diagram of a dynamic command according to an embodiment of the present invention. Again referring to FIG. 4, in an embodiment of the present invention, because a storage device in an electronic apparatus may not be written in an XML script, a code in the test response program 407 may be utilized to prompt the electronic apparatus 405 to send index information of all functions in a storage device (e.g., a memory card) of the electronic device 405 to the testing apparatus 401. Thus, the testing apparatus 401 may learn the location of the function to be tested. Taking FIG. 7 as an example, to test the function of a program for reading an image program of a memory card in an electronic apparatus, the electronic apparatus 405 first informs testing apparatus 401 of the index information of the memory card to allow the testing apparatus 401 to learn that the function is located at a third level of a particular image. Therefore, to test the function, a command is sent to perform the function after moving three times downwards in the particular image. The program block 700 shows operations of the dynamic command. It should be noted that, the dynamic command is not limited to a command stored in a storage device other than the electronic apparatus, but generally refers to a command that cannot be expressed in a static description using an XML file and dynamically changes a location of an icon corresponding to the function along with a current status of an electronic apparatus. For example, the function menu in a cell phone contact list changes along with information in the contact list. Therefore, as an example of a dynamic command in an electronic apparatus, the command of the function menu is a dynamic command.

Figure 8:
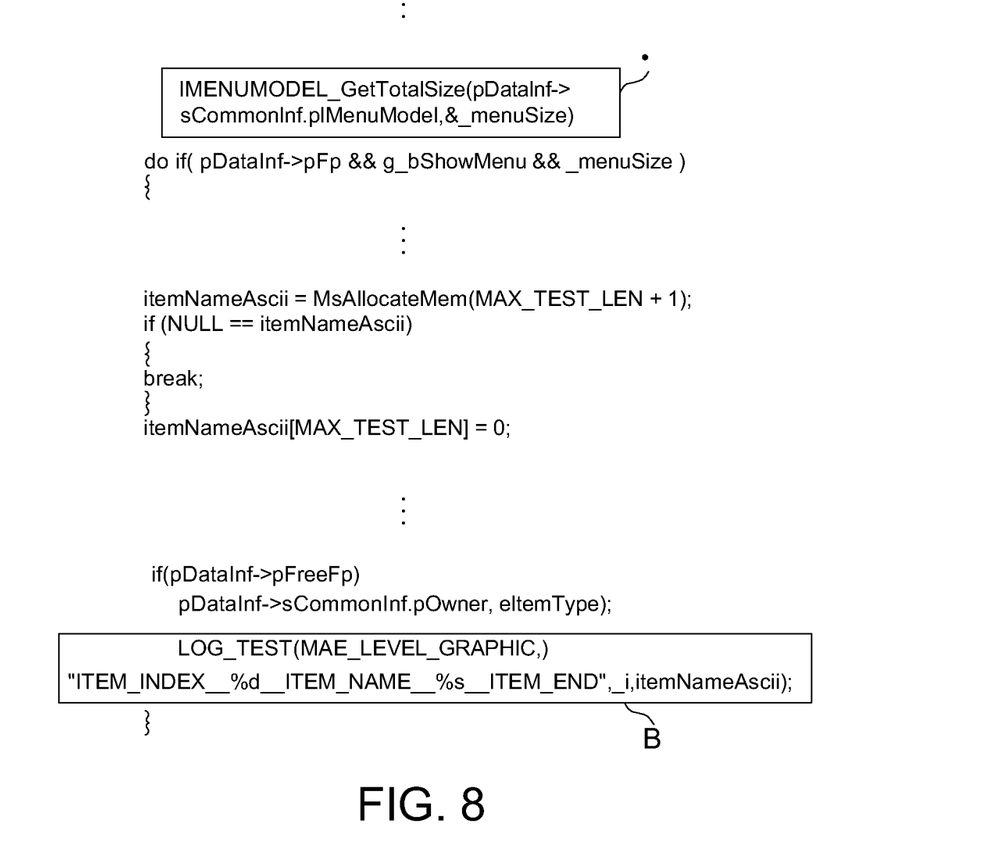
FIG. 8 shows details for obtaining a part of a code of index information of an electronic apparatus.

FIG. 8 shows operations details of a part of a test program for obtaining index information of an electronic apparatus according to an embodiment of the present invention. It should be noted that, FIG. 8 only discloses a part of the test program, and the disclosed part of the test program is utilized as an example rather than a limitation to the present invention. Any modifications made to the part of the test program by a person having ordinary skill in the art for achieving the same effects are encompassed within the scope of the present invention. A code A in FIG. 8 is utilized for "obtaining the number of items in the user interface", and a code B is utilized for "analyzing associated information of the items". The information after the analysis is sent back to the testing apparatus 401 so that the testing apparatus 401 may learn a location of the function to be tested.

Figure 9:
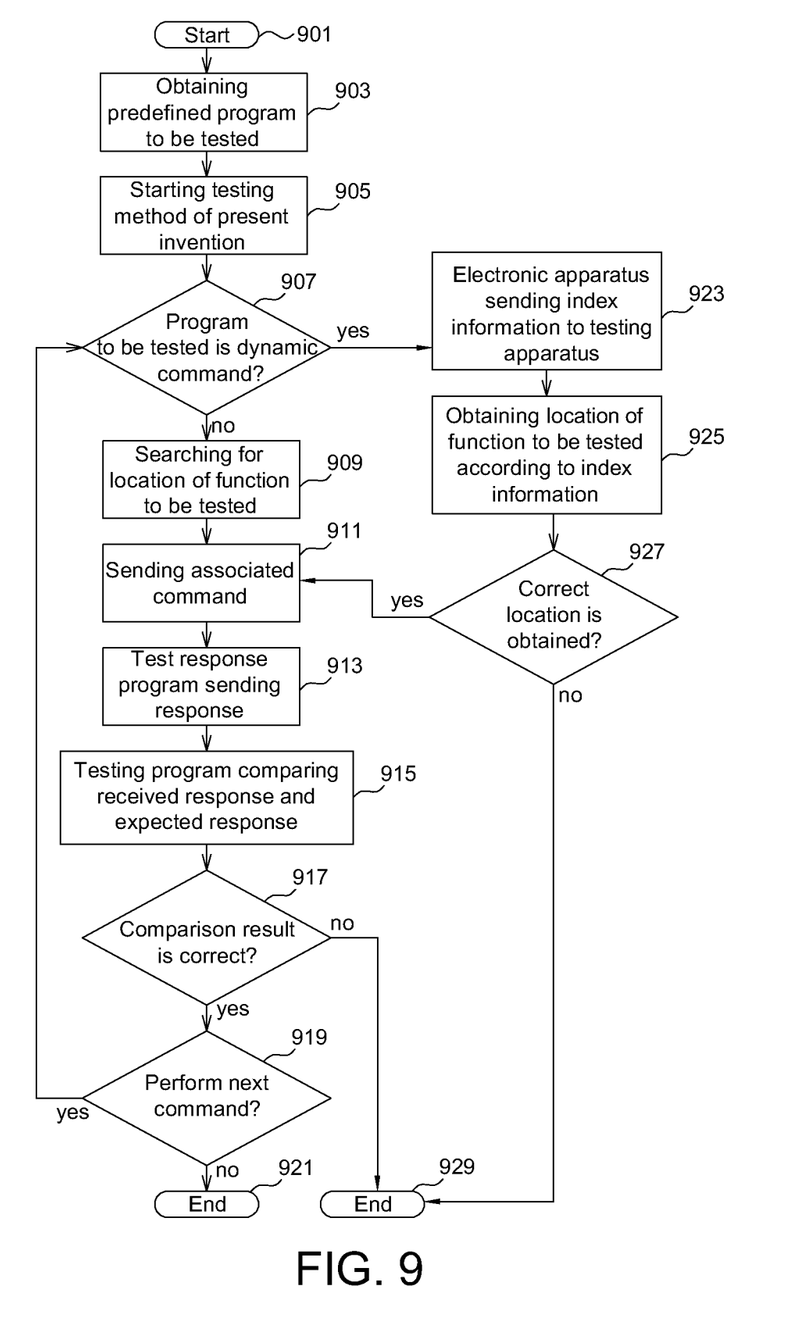
FIG. 9 is a flowchart of a testing method according to an embodiment of the present invention.

FIG. 9 shows a flowchart of a testing method according to an embodiment of the present invention. The method includes the following steps.

The method begins in Step 901.

In Step 903, a predefined program to be tested is obtained. This step may further include obtaining a window ID. As previously stated, a particular window corresponds to a particular function, and thus obtaining the window ID is contributed to the accuracy of sending the command. For example, when it is determined that the function to be tested does not satisfy the expected function of the current window of the electronic apparatus, the command is not sent.

In Step 905, the testing method of the present invention begins. For example, the method may begin automatically.

In Step 907, it is determined whether the program to be tested is a dynamic command. Step 923 is performed when the program to be tested is a dynamic command, or else Step 909 is performed.

In Step 909, a location of the function to be tested is searched.

In Step 911, an associated command is sent according to the location of the function to be tested.

In Step 913, a test response program sends a response.

In Step 915, the test program compares the received response and an expected response.

In Step 917, it is determined whether a comparison result is correct. When the comparison result is incorrect, it means the function under test is faulty, and so Step 929 is performed to end the test process. Alternatively, the testing apparatus may display an error message when the comparison result is incorrect. When the comparison shows that the function under test is functional, Step 919 is performed.

In Step 919, it is determined whether a next command is to be performed. Step 907 is iterated when a next command is to be performed, or else Step 921 is performed.

In Step 921, the process ends.

In Step 923, the electronic apparatus sends index information to the testing apparatus.

In Step 925, the location of the function to be tested is obtained according to the index information.

In Step 927, it is determined whether a correct location is obtained. Step 911 is iterated when a correct location is obtained, or else Step 929 is performed to end the process.

Thus, according to the above embodiments, the issue of having to constantly changing the test program for cooperating with different user interfaces and hardware statuses is eliminated, and automated tests can be implemented without constant manual control.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A testing method, for testing a function of a program in an electronic apparatus, the program associating the function to an icon on an user interface, the method comprising:
   a) searching for a location of the function in the program, detecting a hardware status corresponding to the function, stopping testing the function when an error occurs in the hardware status, and not displaying a corresponding icon when the error occurs in the hardware status, wherein the location comprises a position of the icon on the user interface;
   b) sending a command according to the location to perform the function; and
   c) determining whether an error occurs in the function according to a response of the function in response to the command;
   wherein, the command comprises a sub-command representing a user behavior of moving to the icon on the user interface;
   wherein, step (a) further comprises:
      a1) determining whether the function corresponds to a dynamic command to generate a determination result;
      a2) obtaining index information of all functions in the user interface from the electronic apparatus when the determination result is affirmative, and obtaining the location of the function according to the index information; and a3) obtaining the location of the function according to the program to be tested when the determination result is negative; and wherein, step (b) further comprises determining a function corresponding to the user interface, and stopping sending the command when the function is not a function of the user interface.

2. The method according to claim 1, comprising:
not displaying an icon corresponding to a hardware device when the error condition shows the hardware device corresponding to the function is not in the electronic apparatus.

3. The method according to claim 1, comprising:
displaying an icon corresponding to a hardware device with a different format when the error condition shows the hardware device corresponding to the function is not in the electronic apparatus.

4. The method according to claim 1, wherein the program is an extensible markup language (XML) file.

5. The method according to claim 1, wherein the index information is provided by a storage device associated with the electronic apparatus.

6. The method according to claim 1, wherein step (a2) comprises:
   d1) obtaining a number of a plurality of items in the user interface;
   d2) analyzing a plurality of sets of information associated with the items; and
   d3) obtaining the location of the function according to the number and the associated information.

7. A testing apparatus, for testing a function of a program in an electronic apparatus, the program associating the function to an icon on a user interface, the testing apparatus comprising:
   a storage device, storing a test program;
   a control unit, for executing the program to perform steps of:
      a) searching for a location of the function in the program, wherein the location comprises a position of the icon on the user interface;
      b) sending a command according to the location to perform the function; and
      c) determining whether an error occurs in the function according to a response of the function in response to the command;
   wherein, the command comprises a sub-command representing a user behavior of moving to the icon on the user interface; and
   wherein, step (b) further comprises determining a function corresponding to the user interface, and stopping sending the command when the function is not a function of the user interface.

8. The apparatus according to claim 7, wherein the control unit further detects a hardware status corresponding to the function, and stops testing the function when an error occurs in the hardware status.

9. The apparatus according to claim 8, wherein the icon is displayed on the electronic apparatus when the program is executed, and the control unit further stops displaying the corresponding icon when the error occurs in the hardware status.

10. The apparatus according to claim 8, wherein the control unit controls to display an icon corresponding to a hardware device with a different format when the error condition shows the hardware device corresponding to the function is not in the electronic apparatus.

11. The apparatus according to claim 7, wherein when the control unit searches for the location of the function in the program, the control unit performs steps of:
   a1) determining whether the function corresponds to a dynamic command to generate a determination result;
   a2) obtaining index information of all functions in the user interface from the electronic apparatus when the determination result is affirmative, and obtaining the location of the function according to the index information; and
   a3) obtaining the location of the function according to the program to be tested when the determination result is negative.

12. The apparatus according to claim 11, wherein step (a2) comprises:
   d1) obtaining a number of a plurality of items in the user interface;
   d2) analyzing a plurality of sets of information associated with the items; and
   d3) obtaining the location of the function according to the number and the associated information.

* * * * *